(12) United States Patent
Silny et al.

(10) Patent No.: US 9,057,774 B2
(45) Date of Patent: Jun. 16, 2015

(54) POSITION DETERMINATION USING LOCAL TIME DIFFERENCE

(75) Inventors: John F. Silny, Playa Vista, CA (US); Mark R. Skidmore, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 536 days.

(21) Appl. No.: 13/440,294

(22) Filed: Apr. 5, 2012

(65) Prior Publication Data

US 2013/0265200 A1 Oct. 10, 2013

(51) Int. Cl.
| | |
|---|---|
| G01S 3/02 | (2006.01) |
| G01S 5/10 | (2006.01) |
| G01S 19/11 | (2010.01) |
| G01S 19/42 | (2010.01) |
| G01S 5/02 | (2010.01) |

(52) U.S. Cl.
CPC . *G01S 5/10* (2013.01); *G01S 19/11* (2013.01); *G01S 19/42* (2013.01); *G01S 5/0252* (2013.01)

(58) Field of Classification Search
CPC .......... G01S 3/02; G01S 19/11; G01S 19/42; G01S 5/0252
USPC .......... 342/458, 463, 453, 387, 118
See application file for complete search history.

(56) References Cited

U.S. PATENT DOCUMENTS

| | | | |
|---|---|---|---|
| 4,472,720 A | 9/1984 | Reesor | |
| 4,652,884 A | 3/1987 | Starker | |
| 5,160,935 A | 11/1992 | Inamiya | |
| 5,365,447 A | 11/1994 | Dennis | |
| 5,552,795 A | 9/1996 | Tayloe et al. | |
| 5,760,738 A | 6/1998 | Kawano | |
| 5,774,829 A | 6/1998 | Cisneros et al. | |
| 5,841,398 A | 11/1998 | Brock | |
| 6,040,798 A | 3/2000 | Kinal et al. | |
| 6,563,457 B2 | 5/2003 | Chang et al. | |
| 6,628,234 B2 | 9/2003 | Jandrell | |
| 6,950,060 B1 | 9/2005 | Klein | |
| 7,030,812 B2 | 4/2006 | Bekritsky et al. | |
| 7,302,269 B1 | 11/2007 | Crawford et al. | |
| 7,315,745 B2 | 1/2008 | Duffett-Smith et al. | |
| 7,411,937 B2 | 8/2008 | Guilford | |
| 7,847,734 B2 | 12/2010 | Wu | |
| 2001/0050633 A1 | 12/2001 | Thomas | |
| 2002/0145557 A1 | 10/2002 | Roy et al. | |
| 2003/0236621 A1 | 12/2003 | Sirola et al. | |
| 2005/0122260 A1 | 6/2005 | Dunas et al. | |
| 2008/0231513 A2 | 9/2008 | Torimoto et al. | |
| 2012/0081248 A1* | 4/2012 | Kennedy et al. | 342/118 |
| 2012/0162014 A1* | 6/2012 | Wu et al. | 342/387 |
| 2012/0188938 A1* | 7/2012 | Venkatraman et al. | 370/328 |

* cited by examiner

*Primary Examiner* — Harry Liu
(74) *Attorney, Agent, or Firm* — Burns & Levinson LLP; Joseph M. Maraia

(57) ABSTRACT

Described are computer-based methods and apparatuses, including computer program products, for determining a position. In some examples, the method includes determining measured time receipt differences from associated local receipt times for each pair of plurality of signals; determining a range difference for each of the plurality of signals based on the measured time receipt differences for each of the pairs of the plurality of signals; determining hypothesized range differences based on a hypothesized user position; determining an estimation difference for each of the plurality of signals based on the range difference and the hypothesized range difference for each of the plurality of signals based on a figure of merit; minimizing the estimation difference for the figure of merit based on a plurality of hypothesized user positions and an optimization routine; and outputting a user position based on a hypothesized user position associated with the minimized figure of merit.

12 Claims, 6 Drawing Sheets

POSITION DETERMINATION USING LOCAL TIME DIFFERENCE

BACKGROUND

Positioning, navigation, and timing systems generally utilize natural or manmade signals to determine position. Manmade signals can originate from either terrestrial-based or space-based sources. Purposed-built space systems include global positioning system (GPS)/wide area augmentation system (WAAS), Galileo/European Geostationary Navigation Overlay System (EGNOS), and BeiDou Navigation System. These positioning systems typically utilize dedicated transmission systems and globally synchronized time sources. However, these dedicated transmission systems and globally synchronized time sources are expense and difficult to build and maintain. Also, these dedicated transmission systems and globally synchronized time sources are subject to interference and/or denial of service due to their specialized architecture/components. Thus, a need exists in the art for improved position determination using local receipt time differences of transmitted signals.

SUMMARY

One approach is a system that provides position determination. The system includes a communication and timing module configured to receive a plurality of signals, the plurality of signals transmitted from one or more ground transmitters and each of the plurality of signals relayed via one or more relay devices and associate a local receipt time with each of the plurality of signals upon receipt of the signals. The system further includes a measured range difference module configured to determine measured time receipt differences from the associated local receipt times for each pair of the plurality of signals and determine a range difference for each of the plurality of signals based on the measured time receipt differences for each of the pairs of the plurality of signals. The system further includes a predicted range difference module configured to determine a hypothesized user position and determine hypothesized range differences based on the hypothesized user position. The system further includes an optimization module configured to determine an estimation difference for each of the plurality of signals based on the range difference and the hypothesized range difference for each of the plurality of signals based on a figure of merit and minimize the figure of merit based on a plurality of hypothesized user positions and an optimization routine. The system further includes a user position module configured to output a user position based on a hypothesized user position associated with the minimized figure of merit.

Another approach is a method which determines a position. The method includes receiving a plurality of signals, the plurality of signals transmitted from one or more ground transmitters and each of the plurality of signals relayed via one or more relay devices. The method further includes associating a local receipt time with each of the plurality of signals upon receipt of the signals; determining measured time receipt differences from the associated local receipt times for each pair of the plurality of signals; determining a range difference for each of the plurality of signals based on the measured time receipt differences for each of the pairs of the plurality of signals; determining a hypothesized user position; determining hypothesized range differences based on the hypothesized user position; determining an estimation difference for each of the plurality of signals based on the range difference and the hypothesized range difference for each of the plurality of signals based on a figure of merit; minimizing the estimation difference for the figure of merit based on a plurality of hypothesized user positions and an optimization routine; and outputting a user position based on the hypothesized user position associated with the minimized figure of merit.

Another approach is a computer program product which determines a position. The computer program product is tangibly embodied in an information carrier. The computer program product includes instructions being operable to cause an information processing apparatus to receive a plurality of signals, the plurality of signals transmitted from one or more ground transmitters and each of the plurality of signals relayed via one or more relay devices; associate a local receipt time with each of the plurality of signals upon receipt of the signals; determine measured time receipt differences from the associated local receipt times for each pair of the plurality of signals; determine a range difference for each of the plurality of signals based on the measured time receipt differences for each of the pairs of the plurality of signals; determine a hypothesized user position; determine hypothesized range differences based on the hypothesized user position; determine an estimation difference for each of the plurality of signals based on the range difference and the hypothesized range difference for each of the plurality of signals based on a figure of merit; minimize the estimation difference for the figure of merit based on a plurality of hypothesized user positions and an optimization routine; and output a user position based on a hypothesized user position associated with the minimized figure of merit.

In other examples, any of the approaches above can include one or more of the following features.

In some examples, the optimization module is further configured to determine if the figure of merit is less than a tolerance parameter and optimize the range difference for each of the plurality of signals to minimize the figure of merit for each of the plurality of signals based on the determination if the figure of merit is less than the tolerance parameter.

In other examples, the optimization module is further configured to estimate correlated errors associated with each pair of the plurality of signals to form an error covariance matrix and generate the figure of merit between the range difference and the hypothesized range difference based on the error covariance matrix.

In some examples, each of the plurality of signals comprises a uniquely identifiable pseudo random noise code.

In other examples, the local receipt time includes a same common time or a known timing difference from a common time.

In some examples, each of the one or more relay devices receives signals of the plurality of signals and transmits the signals.

In other examples, the one or more ground transmitters includes one centralized ground transmitter.

In some examples, the one or more ground transmitters include two or more ground transmitters. The two or more ground transmitters synchronize transmission of the plurality of signals.

In other examples, the method further includes determining if the estimation difference is less than a tolerance parameter and optimizing the range difference for each of the plurality of signals to minimize the estimation difference for each of the plurality of signals based on the determining if the estimation difference is less than the tolerance parameter In some examples, the method further includes repeating the optimization of the range difference until the estimation difference is less than the tolerance parameter.

In other examples, the method further includes estimating correlated errors associated with each pair of the plurality of signals to form an error covariance matrix and generating the figure of merit between the range difference and the estimated range difference based on the error covariance matrix.

In some examples, each of the plurality of signals includes a uniquely identifiable pseudo random noise code.

The position determination techniques described herein can provide one or more of the following advantages. An advantage of the technology is that the position determination described herein utilizes local time differences, thereby reducing the expense associated with building and maintaining globally synchronized time sources. Another advantage of the technology is that the signals can be relayed through any type of relay device (even an existing device), thereby reducing the expense associated with building and maintaining purpose-built relay devices (e.g., purpose-built satellites, purpose-built ground stations, etc.).

Another advantage of the technology is that the user position is determined based on information maintained within ground devices (e.g., clock transmitter, user device, etc.) and not orbital devices (e.g., satellites, etc.), thereby increasing the effective uses of the technology by enabling the ground devices to be quickly updated based on position determination techniques. Another advantage of the technology is that the relay devices can include the existing on-orbit fleet of commercial communication satellites, thereby enabling low cost and rapid deployment of the technology since purpose-built satellites do not have to be built and deployed.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The position determination method and apparatus includes technology that, generally, determines a user's position in 3-dimensional space (e.g., estimates their absolute position in 3-dimensional space in some coordinate system) using local time differences between received signals (e.g., a pseudo-random noise code, etc.). The technology advantageously utilizes local clocks at the user's device for the position determination, thereby reducing the complexity and cost associated with maintaining global time sources and reducing the potential for interference to any global time sources.

The technology can utilize a ground station, an uplink communication antenna that transmits identification information and/or signals, relay devices (e.g., a set of satellites in geosynchronous orbit) that each act as relays to retransmit the signals to a region of interest, a user antenna in the region of interest to receive the relayed signals, and a computing device with a local clock to analyze the received signals and extract the estimated absolute position of the user based on time differences of the received signals with respect to the computing device's local clock. The signals can include, for example, orthogonal pseudo-noise codes to aid in information extraction and/or identification.

In some examples, the relay devices (e.g., satellites) relay the signals and do not add any time information to the relayed information. In other words, the relay devices do not need globally synchronized clocks since the relay devices are not adding any time information to the relayed signals. The use of relay devices that do not need globally synchronized clocks advantageously reduces the cost to deploy the technology by avoiding purpose-built relay devices. The relay devices can be, for example, existing assets (e.g. COMSATs) that can provide the satellite network as described herein without significant modification. The relay devices can be in any type of orbit (e.g., geostationary earth orbit (GEO), low earth orbit (LEO), medium earth orbit (MEO), etc.). The relay devices can advantageously be positioned in GEO to provide position determination capability in a pre-defined region of interest with a small constellation of relay devices (e.g., four satellites in GEO, etc.) and/or provide the technology with accurate distance between the relay devices and ground station since GEO devices generally have very well known positions.

Figure 1:
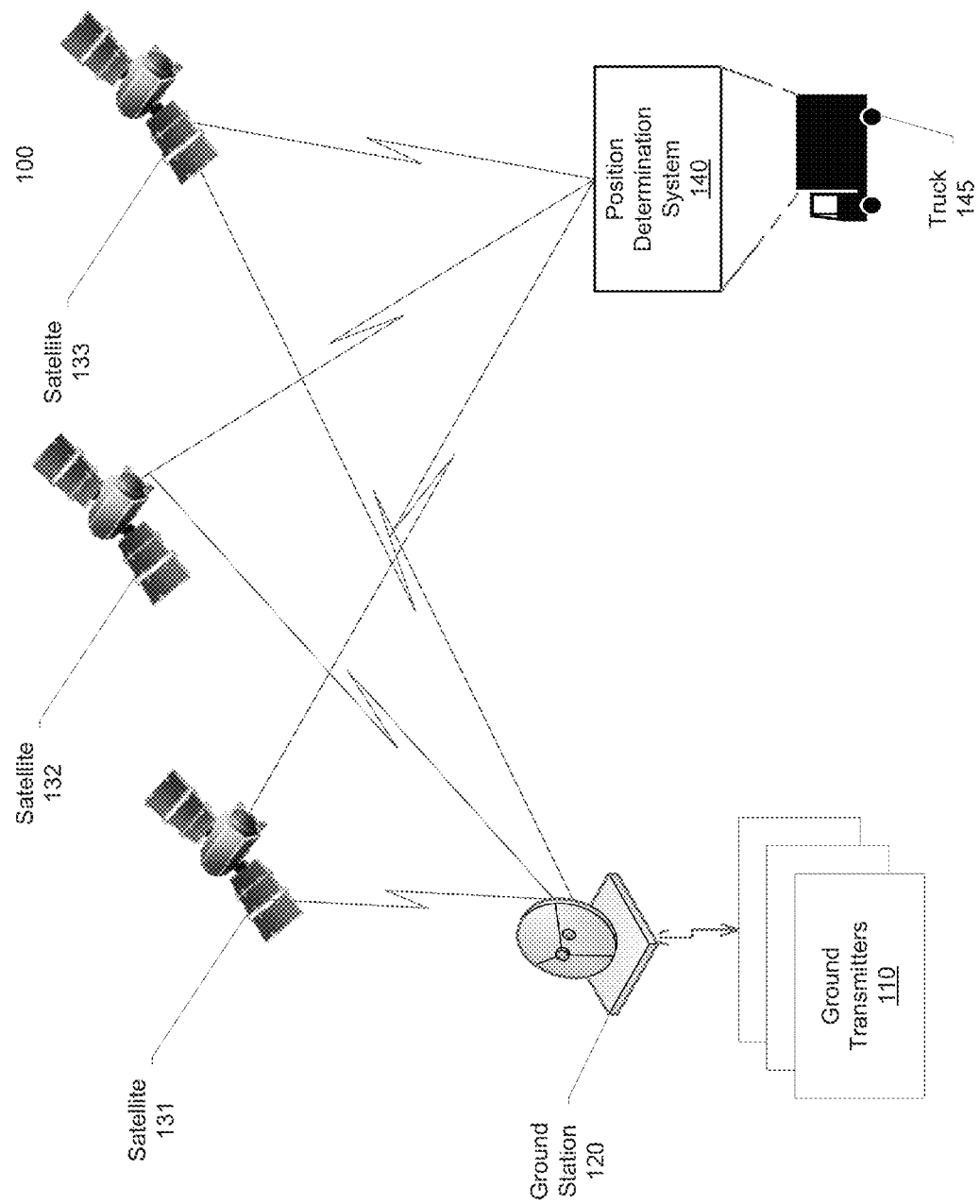
FIG. 1 is a diagram of an exemplary position determination environment.

FIG. 1 is a diagram of an exemplary position determination environment 100. The environment 100 includes one or more ground transmitters 110, a ground station 120, satellites (131, 132, and 133), and a position determination system 140. The position determination system 140 is mounted within a truck 145, and the position determination system 140 determines the position of the truck 145. The ground transmitters 110 communicate signals to the ground station 120. The ground station 120 communicates the signals to the satellites (131, 132, and 133) and the satellites (131, 132, and 133) relay the signals to the position determination system 140. The position determination system 140 determines a position of the truck 145 based on the signals and/or other information associated with the environment 100 (e.g., known distances between the ground station 120 and the satellites (131, 132, and 133), distance between the satellites (131, 132, and 133), etc.).

Although FIG. 1 illustrates the truck 145, the position determination system 140 can be mounted within and/or utilized with any type of device or platform (e.g., handheld position device, airplane, tank, wristwatch, laptop, etc.). Although FIG. 1 illustrates three satellites (131, 132, and 133), the technology can utilize any number (e.g., ten relay devices, twenty relay devices, etc.) and/or type of relay devices (e.g., point to point radio transmitters/receivers, reflectors, etc.). Although FIG. 1 illustrates a direct link from ground station to satellite to truck, other signal links are possible (e.g., from ground station, to first satellite, then to second satellite, and finally to truck, etc.). Although FIG. 1 illustrates a single ground station, multiple ground stations transmitting unique signals can be utilized (e.g., ground station A transmitting signal A1 through relay satellite 1, ground station B transmitting signal B1 through relay satellite 1, etc.).

Figure 2:
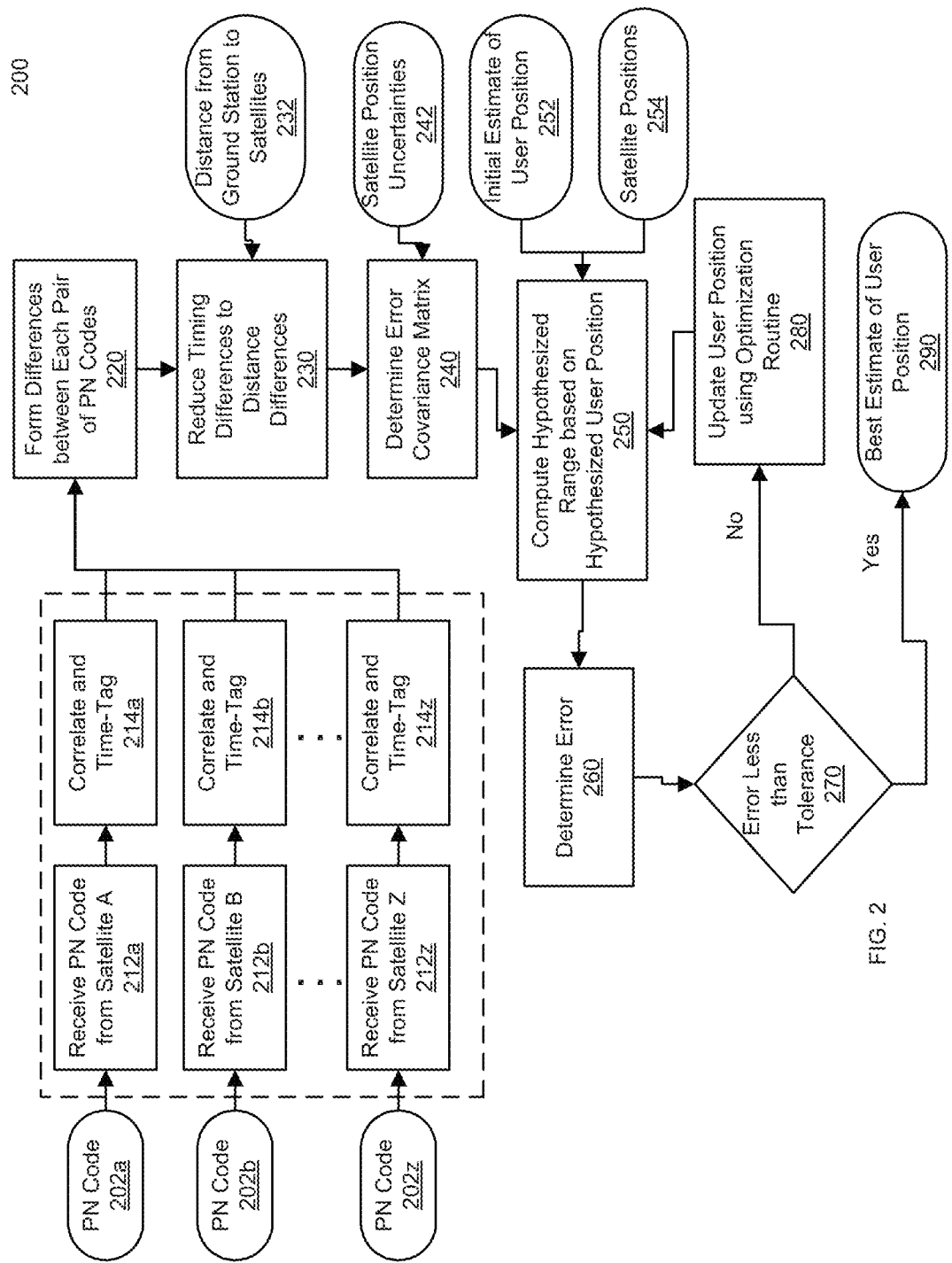
FIG. 2 is a block diagram of an exemplary position determination process.

FIG. 2 is a block diagram of an exemplary position determination process 200 utilizing, for example, the position determination system 140 of FIG. 1. The position determination system 140 receives (212a, 212b through 212z) a plurality of signals (e.g., pseudo noise (PN) Codes 202a, 202b through 202z) from relay devices. Table 1 illustrates exemplary PN Codes with routing paths. The PN Codes illustrated in Table 1 are transmitted from a ground transmitter through the indicated relay devices to the receiving position determination system. The PN Codes illustrated in Table 1 are illustrative of a single set of PN Codes transmitted from a ground transmitter for determination of a user location by the receiving position determination system (i.e., the signals are transmitted from the ground transmitter at or substantially at the same time). Each PN code corresponds to a unique routing path.

TABLE 1

Exemplary PN Codes

| PN Code | Routing Path |
| --- | --- |
| PN Code 202a | Relay through Satellite A in GEO A Orbit |
| PN Code 202b | Relay through Satellite B in GEO B Orbit |
| ... | |
| PN Code 202m | Relay through Satellite M in GEO M Orbit |
| PN Code 202n | Relay through Satellite N in GEO N Orbit |
| ... | |
| PN Code 202z | Relay through Satellite Z in GEO Z Orbit |

The position determination system 140 correlates (e.g., associates related PN Codes together based a ground transmitter identifier, associates related PN Codes together based on receipt time, etc.) and time-tags (214a, 214b through 214z) the PN Codes 202a, 202b through 202z, respectively, using a local clock of the position determination system 140. The correlation can enable the position determination system 140 to identify PN Codes that originated at the same time from the ground transmitter. The position determination system 140 forms (220) time differences between each unique pair of PN Codes 202a, 202b through 202z. Table 2 illustrates exemplary local time differences between three exemplary PN Codes 202a, 202b, and 202z.

TABLE 2

Exemplary Time Differences

| Unique Pairs | Time difference of receipt using local clock |
| --- | --- |
| PN Code 202a & PN Code 202b | 0 + 0.015 seconds |
| PN Code 202a & PN Code 202z | 0 + 0.005 seconds |
| PN Code 202b & PN Code 202z | 0 − 0.010 seconds |

The position determination system 140 reduces (230) the timing differences to range differences (also referred to as distance differences) based on the speed of light, distance from the ground station to the satellites 232, and/or other information related to the signals transmission (e.g., processing time of the relay through the satellites, change in the speed of light through a non-vacuum medium such as the Earth's atmosphere, etc.). Table 3 illustrates exemplary range differences. In computing the range differences, the known ground station to satellite ranges can be accounted for and removed. If these ranges slowly change over time, updates can be broadcast at low data rates to the users in the transmitted signals (e.g., PN codes, special updates, etc.).

TABLE 3

Exemplary Range Differences

| Unique Pairs | Time Difference | Range Difference |
| --- | --- | --- |
| PN Code 202a & PN Code 202b | +0.015 seconds | 5,000 kilometers |
| PN Code 202a & PN Code 202z | +0.005 seconds | 6,000 kilometers |
| PN Code 202b & PN Code 202z | −0.010 seconds | 350 kilometers |

The position determination system 140 determines (240) an error covariance matrix based on the distance differences and/or satellite position uncertainties 242. Other uncertainties can also be included in the determination of the error covariance matrix and/or any other aspect of the technology (e.g., relay time uncertainty, ground station position uncertainty, ground station transmission time uncertainty, etc.). In some examples, the position determination system 140 determines (240) an error covariance matrix based on a correlation of pair-wise differences. For example, the arrival times, tA, tB, and tC, for three signals A, B, and C, have the following arrival distance differences:

$$dtAB = tA - tB$$

$$dtAC = tA - tC$$

$$dtBC = tB - tC$$

In this example, each of the measurements tA, tB, and tC have errors due to various factors (e.g., environmental interference, transmission interference, etc.). The position determination system 140 can correlate the errors for the distance differences with common measurement data (e.g., dtAB and dtAC both use measurement tA). For example, if tA has a large error, then both dtAB and dtAC probably have a large error depending on the errors in tB and tC. In this example, the pair-wise differences refer to the dt equations (i.e., all combinations of differences based on measured data). The correlations in the error can be compensated for by creating and applying the error covariance matrix. The error covariance matrix can be used to correct for signal noise and/or any other issues associated with the signals.

The position determination system 140 computes (250) a hypothesized range based on the distance difference, the error covariance matrix, a hypothesized estimate of user position 252 (e.g., estimated position in global coordinates, etc.), and/or satellite positions 254. In some examples, the initial hypothesized estimate of user position 252 is inputted by the user, received from another computing device (e.g., device, cellular tower triangulation, internal navigation device, etc.) and/or determined based on any other position input/device.

The position determination system 140 determines (260) an error of the user's hypothesized position relative to the measured data. In some examples, the position determination system 140 determines (260) the error of the user position (e.g., 10 meters due west, 34 meters southwest, etc.) based on the user position, the error covariance matrix, the hypothesized estimate of user position 252, and/or the satellite positions 254. In other examples, the position determination system 140 determines (260) the error of the user position based on a figure of merit (FOM). The position determination system 140 can, for example, determine the FOM based on a mean-square-error (MSE) between pseudo and measured receiver-to-satellite range differences weighted by the error covariance matrix.

The position determination system 140 determines (270) if the error of the user position is less than an error tolerance (e.g., 2 kilometers, 150 meters, etc.). If the error of the user position is not less than the error tolerance, the position determination system 140 updates (280) the hypothesized user position using an optimization routine (e.g., grid search, gradient descent, etc.) and continues processing (250, 260, and 270). If the error of the user position is less than the error tolerance, the position determination system 140 outputs the best estimate of the user position 290. In some examples, the position determination system 140 updates (280) the user position based on a grid search, a gradient descent, Karush-Kuhn-Tucker (KKT) non-linear equations, and/or any other type of optimization technique.

Figure 3:
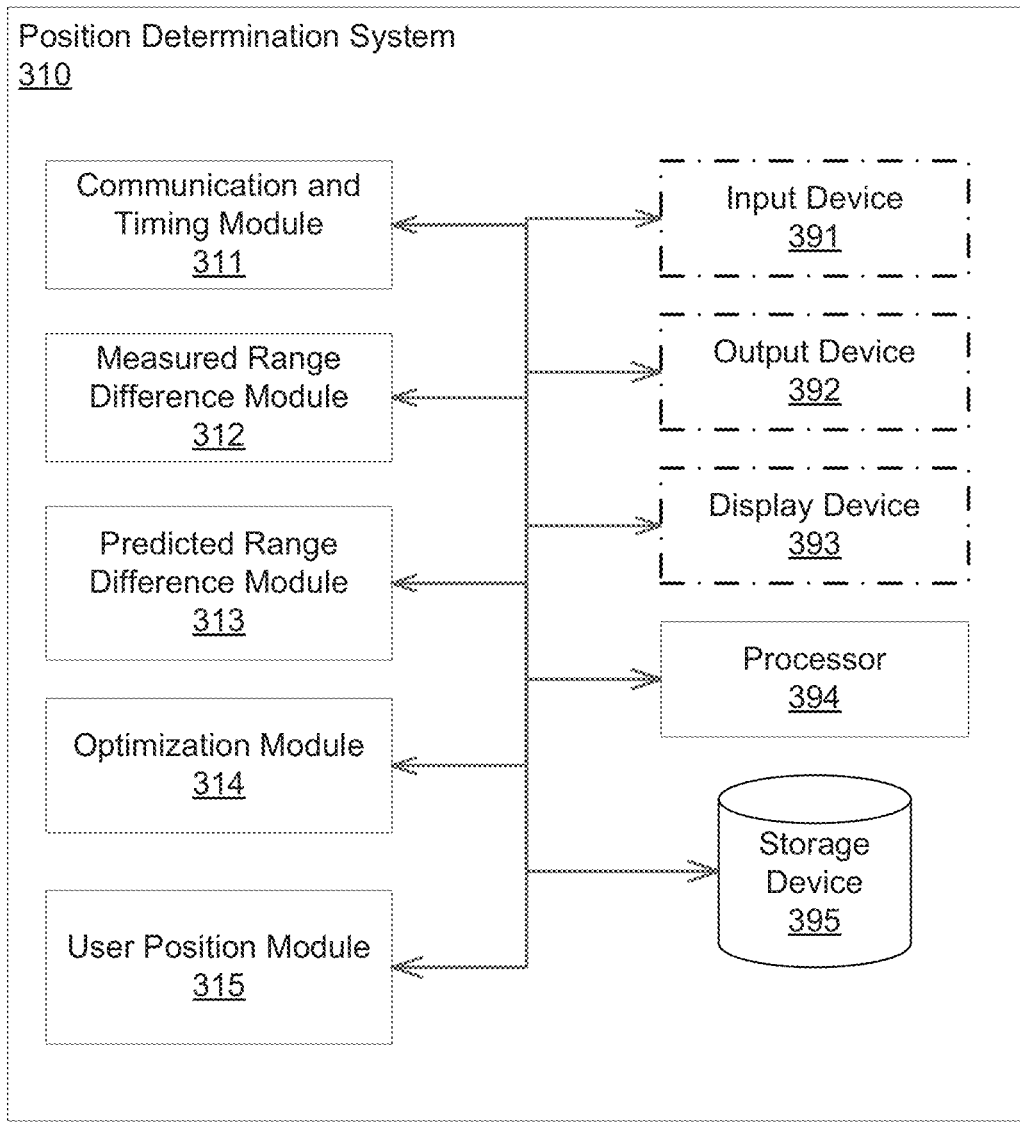
FIG. 3 is a diagram of an exemplary position determination system.

FIG. 3 is a diagram of a position determination system 310. The radar data processing system 310 includes a communication and timing module 311, a measured range difference module 312, a predicted range difference module 313, an optimization module 314, a user position module 315, an input device 391, an output device 392, a display device 393, a processor 394, and a storage device 395. The input device 391, the output device 392, and the display device 393 are optional components of the position determination system 310. In some examples, the position determination system 310 can include some or all of the modules/devices as described herein. The modules and devices described herein can, for example, utilize the processor 394 to execute computer executable instructions and/or one or more modules can each include their own processor to execute computer executable instructions (e.g., an encryption processing unit, a field programmable gate array processing unit, etc.). It should be understood that the position determination system 310 can include, for example, other modules, devices, and/or processors known in the art and/or varieties of the illustrated modules, devices, and/or processors.

The communication and timing module 311 receives a plurality of signals. The plurality of signals is transmitted from one or more ground transmitters and each of the plurality of signals is relayed via one or more relay devices. The communication and timing module 311 associates a local receipt time with each of the plurality of signals upon receipt of the signals. The association of the local receipt time advantageously enables the technology to avoid the costs associated with a globally synchronized time source, thereby decreasing the deployment and maintenance costs for the technology.

The measured range difference module 312 determines measured time receipt differences from the associated local receipt times for each pair of the plurality of signals. The measured range difference module 312 determines a range difference for each of the plurality of signals based on the measured time receipt differences for each of the pairs of the plurality of signals.

The predicted range difference module 313 determines a hypothesized user position. The predicted range difference module 313 determines hypothesized range differences based on the hypothesized user position.

The optimization module 314 determines an estimation difference for each of the plurality of signals based on the range difference and the hypothesized range difference for each of the plurality of signals based on a figure of merit and minimizes the figure of merit based on a plurality of hypothesized user positions and an optimization routine. In some examples, the optimization module 314 determines if the figure of merit is less than a tolerance parameter and optimizes the range difference for each of the plurality of signals to minimize the figure of merit for each of the plurality of signals based on the determination if the figure of merit is less than the tolerance parameter. In other examples, the optimization module 314 estimates correlated errors associated with each pair of the plurality of signals to form an error covariance matrix and generates the figure of merit between the range difference and the hypothesized range difference based on the error covariance matrix.

The user position module 315 outputs a user position based on a hypothesized user position associated with the minimized figure of merit.

The input device 391 receives information (e.g., instructions) associated with the position determination system 310 from a user (not shown) and/or another computing system (not shown). The input device 391 can include, for example, a keyboard, a scanner, etc. The output device 392 outputs information associated with the location determination system 310 (e.g., information to a printer (not shown), information to a speaker, etc.).

The display device 393 displays information associated with the position determination system 310 (e.g., best known user position, status information, configuration information, etc.). The processor 394 executes the operating system and/or any other computer executable instructions for the position determination system 310 (e.g., executes applications, etc.).

The storage device 395 stores position information and/or relay device information. The storage device 395 can store information and/or any other data associated with the position determination system 310. The storage device 395 can include a plurality of storage devices and/or the position determination system 310 can include a plurality of storage devices (e.g., a position storage device, an absolute satellite position device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
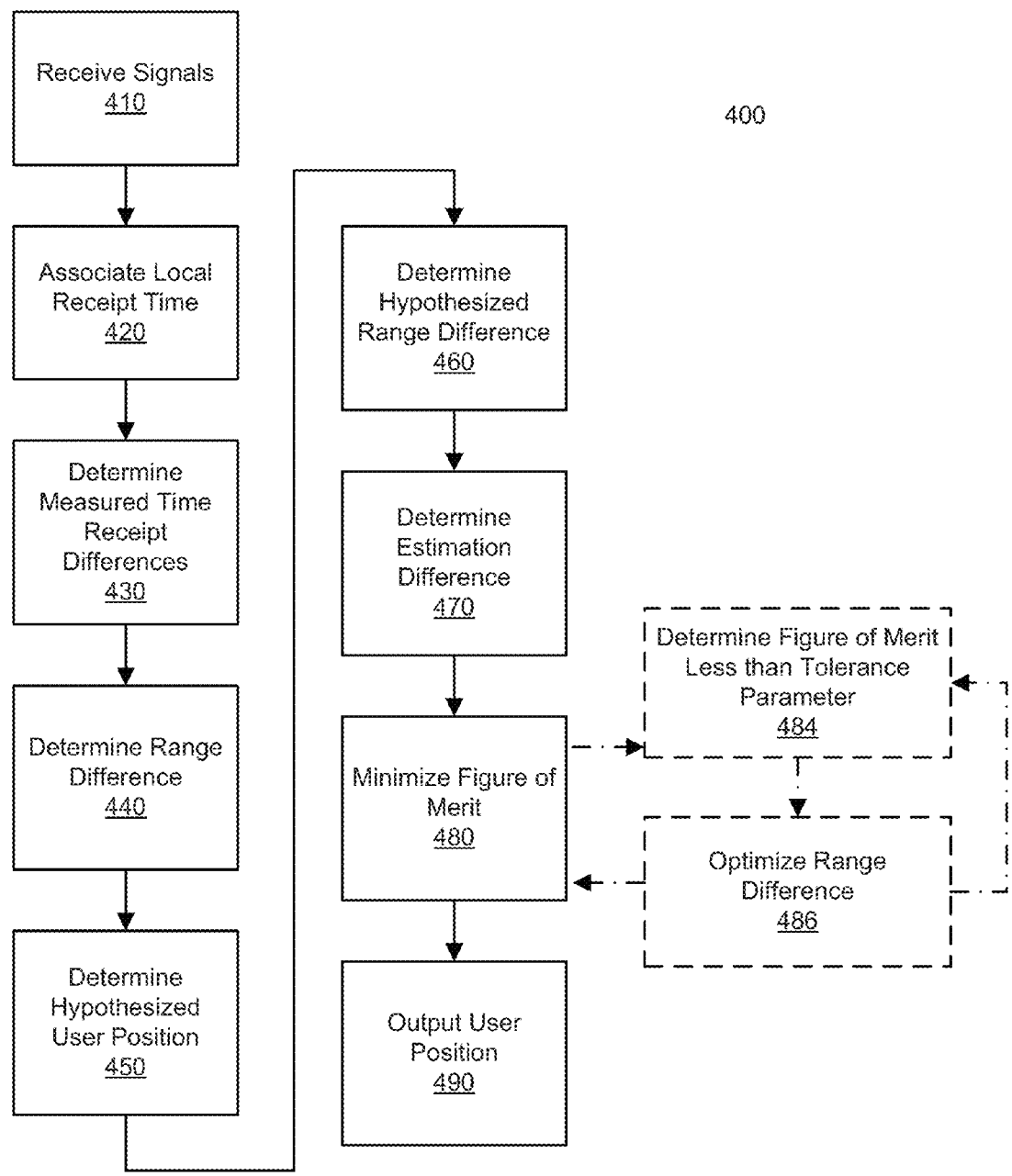
FIG. 4 is a flowchart of an exemplary position determination method.

FIG. 4 is a flowchart of an exemplary position determination method utilizing, for example, the position determination system 310 of FIG. 3. The communication and timing module 311 receives (410) a plurality of signals. The plurality of signals is transmitted from one or more ground transmitters and each of the plurality of signals relayed via one or more relay devices. The communication and timing module 311 associates (420) a local receipt time with each of the plurality of signals upon receipt of the signals. The measured range difference module 312 determines (430) measured time receipt differences from the associated local receipt times for each pair of the plurality of signals. The measured range difference module 312 determines (440) a range difference for each of the plurality of signals based on the measured time receipt differences for each of the pairs of the plurality of signals. The range difference, as illustrated in Table 3 above, can be the difference between the transmission path between the various signals (e.g., transmission path from the ground transmitter through relay device A, transmission path from the ground transmitter through relay device B, etc.). The range difference can include other transmission delays associated with the transmission of the signals (e.g., processing delay, transmission delay, etc.). The time receipt difference, as illustrated in Table 2 above, can be the local timing difference from the receipt of the signals from the ground transmitter (e.g., local time receipt differences for the same PN Codes, local time receipt difference for a set of PN Codes, etc.).

The predicted range difference module 313 determines (450) a hypothesized user position. The predicted range difference module 313 determines (460) hypothesized range differences based on the hypothesized user position. The optimization module 314 determines (470) an estimation difference for each of the plurality of signals based on the range difference and the hypothesized range difference for each of the plurality of signals based on a figure of merit. The estimation difference can be the difference between the estimated range difference (e.g., range difference input by the user, range difference from a relay device database, etc.) and the range difference determined based on the time receipt differences (e.g., receipt of second signal 0.011 seconds after the first signal, receipt of third signal 0.004 seconds after the second signal, etc.). The optimization module 314 minimizes (480) the figure of merit based on a plurality of hypothesized user positions and an optimization routine. The user position module 315 outputs (490) a user position based on the hypothesized user position associated with the minimized figure of merit.

In some examples, the optimization module 314 determines (484) if the figure of merit is less than a tolerance parameter. The optimization module 314 optimizes (486) the range difference for each of the plurality of signals to minimize the figure of merit for each of the plurality of signals based on the determination if the figure of merit is less than the tolerance parameter.

Figure 5:
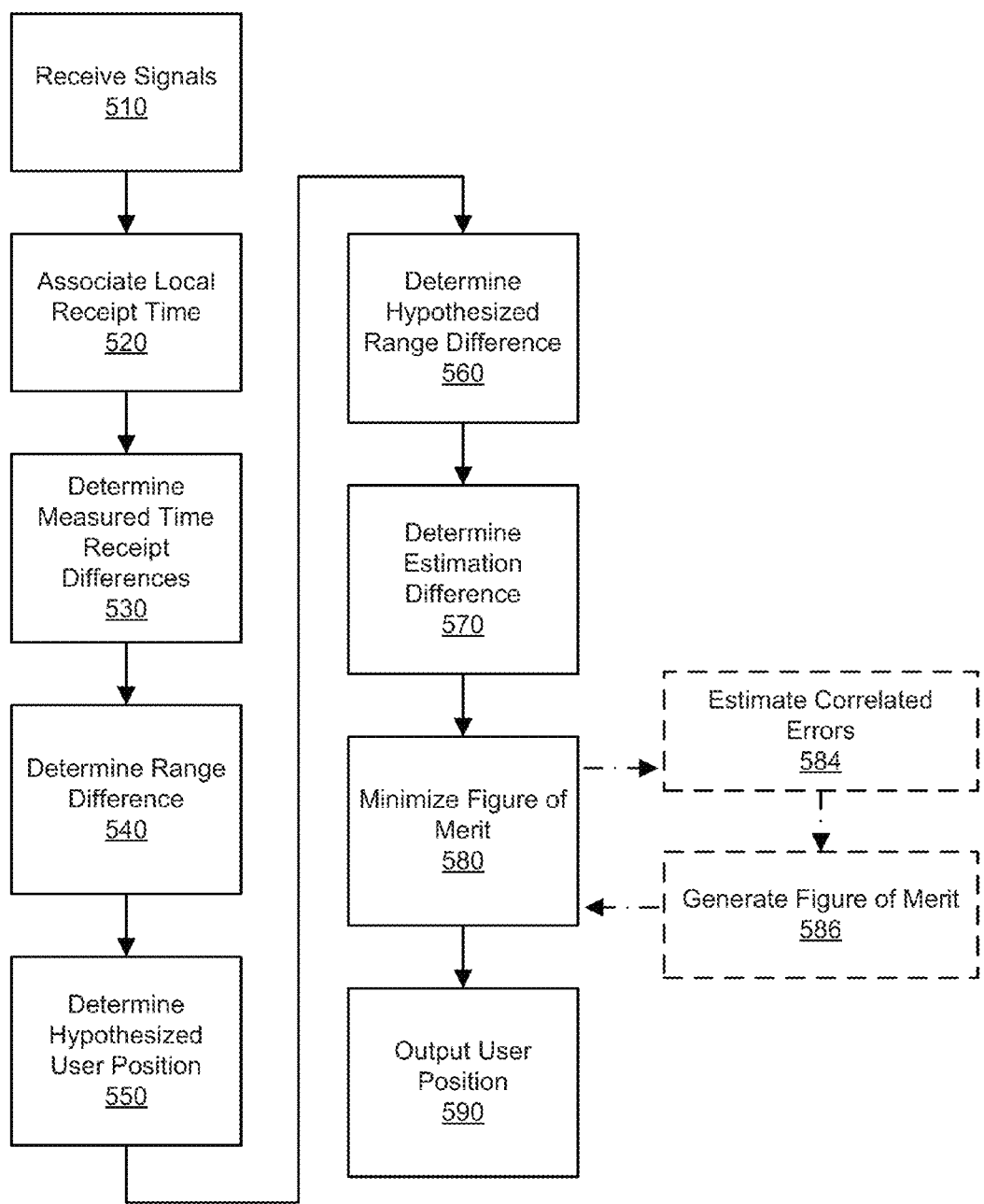
FIG. 5 is a flowchart of another exemplary position determination method.

FIG. 5 is another flowchart of an exemplary position determination method utilizing, for example, the position determination system 310 of FIG. 3. The communication and timing module 311 receives (510) a plurality of signals. The plurality of signals is transmitted from one or more ground transmitters and each of the plurality of signals relayed via one or more relay devices. The communication and timing module 311 associates (520) a local receipt time with each of the plurality of signals upon receipt of the signals. The measured range difference module 312 determines (530) measured time receipt differences from the associated local receipt times for each pair of the plurality of signals. The measured range difference module 312 determines (540) a range difference for each of the plurality of signals based on the measured time receipt differences for each of the pairs of the plurality of signals. The range difference, as illustrated in Table 3 above, can be the difference between the transmission path between the various signals (e.g., transmission path from the ground transmitter through relay device A, transmission path from the ground transmitter through relay device B, etc.). The range difference can include other transmission delays associated with the transmission of the signals (e.g., processing delay, transmission delay, etc.). The time receipt difference, as illustrated in Table 2 above, can be the local timing difference from the receipt of the signals from the ground transmitter (e.g., local time receipt differences for the same PN Codes, local time receipt difference for a set of PN Codes, etc.).

The predicted range difference module 313 determines (550) a hypothesized user position. The predicted range difference module 313 determines (560) hypothesized range differences based on the hypothesized user position. The optimization module 314 determines (570) an estimation difference for each of the plurality of signals based on the range difference and the hypothesized range difference for each of the plurality of signals based on a figure of merit. The estimation difference can be the difference between the estimated range difference (e.g., range difference input by the user, range difference from a relay device database, etc.) and the range difference determined based on the time receipt differences (e.g., receipt of second signal 0.011 seconds after the first signal, receipt of third signal 0.004 seconds after the second signal, etc.). The optimization module 314 minimizes (580) the figure of merit based on a plurality of hypothesized user positions and an optimization routine. The user position module 315 outputs (590) a user position based on the hypothesized user position associated with the minimized figure of merit.

In some examples, the optimization module 314 estimates (584) correlated errors associated with each pair of the plurality of signals to form an error covariance matrix. The optimization module 314 generates (586) the figure of merit between the range difference and the hypothesized range difference based on the error covariance matrix.

Figure 6:
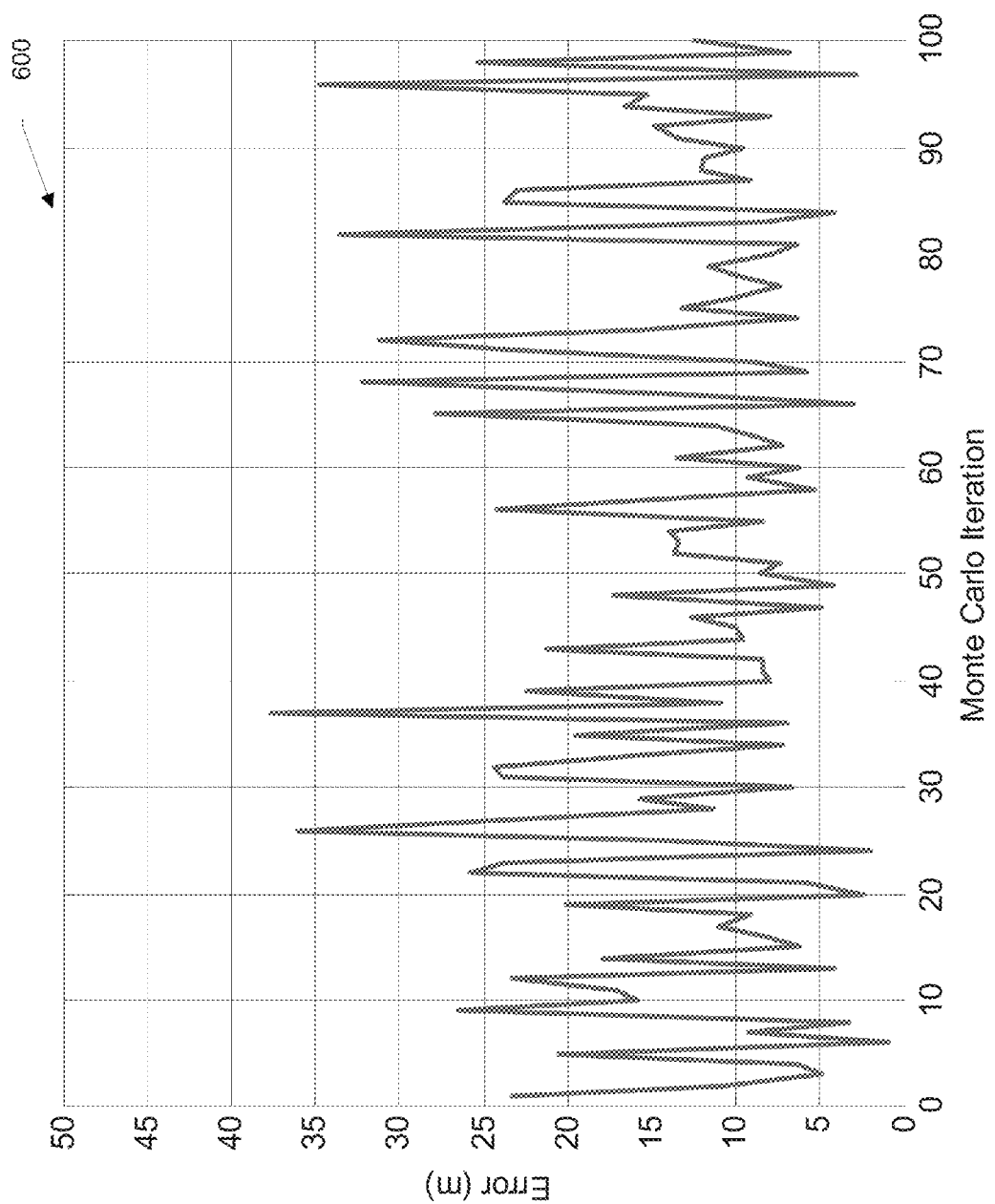
FIG. 6 is a diagram of an exemplary diagram illustrating position errors in a numeric simulation.

FIG. 6 is a diagram of an exemplary diagram 600 illustrating position errors in a numeric simulation. In this exemplary diagram 600, the position errors were calculated using a Monto Carlo simulation with iterations from 1 to 100. As illustrated in this exemplary diagram 600, the position error ranges from 1 to 37 meters. The range and distribution of errors are exemplary for the technology and are implementation specific.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A position determination system, the system comprising:
   a communication and timing module configured to:
      receive a plurality of signals, the plurality of signals transmitted from one or more ground transmitters and each of the plurality of signals relayed via one or more relay devices, each of the plurality of signals including a uniquely identifiable pseudo random noise code, the uniquely identifiable pseudo random noise code providing information related to a unique routing path of a corresponding signal of the plurality of signals, and
      associate a local receipt time with each of the plurality of signals upon receipt of the signals;
   a measured range difference module configured to:
      determine measured time receipt differences from the associated local receipt times for each pair of the plurality of signals, and
      determine a range difference for each of the plurality of signals based on the measured time receipt differences and the information related to the unique routing path for each of the pairs of the plurality of signals;
   a predicted range difference module configured to:
      determine a hypothesized user position, and
      determine hypothesized range differences based on the hypothesized user position;
   an optimization module configured to:
      determine an estimation difference for each of the plurality of signals based on the range difference and the hypothesized range difference for each of the plurality of signals based on a figure of merit, and
      minimize the figure of merit based on a plurality of hypothesized user positions and an optimization routine; and
   a user position module configured to output a user position based on the a hypothesized user position associated with the minimized figure of merit.

2. The position determination system of claim 1, wherein the optimization module is further configured to:
   determine if the figure of merit is less than a tolerance parameter, and
   optimize the range difference for each of the plurality of signals to minimize the figure of merit for each of the plurality of signals based on the determination if the figure of merit is less than the tolerance parameter.

3. The position determination system of claim 1, wherein the optimization module is further configured to:
  estimate correlated errors associated with each pair of the plurality of signals to form an error covariance matrix; and
  generate the figure of merit between the range difference and the hypothesized range difference based on the error covariance matrix.

4. The position determination system of claim 1, wherein the local receipt time comprises a same common time or a known timing difference from a common time.

5. The position determination system of claim 1, wherein each of the different relay devices receives signals of the plurality of signals and transmits the signals.

6. The position determination system of claim 1, wherein the one or more ground transmitters comprises one centralized ground transmitter.

7. The position determination system of claim 1, wherein the one or more ground transmitters comprises two or more ground transmitters, the two or more ground transmitters synchronizing transmission of the plurality of signals.

8. A method for position determination, the method comprising:
  receiving a plurality of signals, the plurality of signals transmitted from one or more ground transmitters and each of the plurality of signals relayed via one or more relay devices, each of the plurality of signals including a uniquely identifiable pseudo random noise code, the uniquely identifiable pseudo random noise code providing information related to a unique routing path of a corresponding signal of the plurality of signals;
  associating a local receipt time with each of the plurality of signals upon receipt of the signals;
  determining measured time receipt differences from the associated local receipt times for each pair of the plurality of signals;
  determining a range difference for each of the plurality of signals based on the measured time receipt differences and the information related to the unique routing path for each of the pairs of the plurality of signals;
  determining a hypothesized user position;
  determining hypothesized range differences based on the hypothesized user position;
  determining an estimation difference for each of the plurality of signals based on the range difference and the hypothesized range difference for each of the plurality of signals based on a figure of merit;
  minimizing the estimation difference for the figure of merit based on a plurality of hypothesized user positions and an optimization routine; and
  outputting a user position based on the hypothesized user position associated with the minimized figure of merit.

9. The method of claim 8, further comprising
  determining if the estimation difference is less than a tolerance parameter; and
  optimizing the range difference for each of the plurality of signals to minimize the estimation difference for each of the plurality of signals based on the determining if the estimation difference is less than the tolerance parameter.

10. The method of claim 9, further comprising repeating the optimizing the range difference until the estimation difference is less than the tolerance parameter.

11. The method of claim 8, further comprising:
  estimating correlated errors associated with each pair of the plurality of signals to form an error covariance matrix; and
  generating the figure of merit between the range difference and the estimated range difference based on the error covariance matrix.

12. A non-transitory computer program product, tangibly embodied in a non-transitory information carrier, the non-transitory computer program product including instructions being operable to cause an information processing apparatus to:
  receive a plurality of signals, the plurality of signals transmitted from one or more ground transmitters and each of the plurality of signals relayed via one or more relay devices, each of the plurality of signals including a uniquely identifiable pseudo random noise code, the uniquely identifiable pseudo random noise code providing information related to a unique routing path of a corresponding signal of the plurality of signals;
  associate a local receipt time with each of the plurality of signals upon receipt of the signals;
  determine measured time receipt differences from the associated local receipt times for each pair of the plurality of signals;
  determine a range difference for each of the plurality of signals based on the measured time receipt differences and the information related to the unique routing path for each of the pairs of the plurality of signals;
  determine a hypothesized user position;
  determine hypothesized range differences based on the hypothesized user position;
  determine an estimation difference for each of the plurality of signals based on the range difference and the hypothesized range difference for each of the plurality of signals based on a figure of merit;
  minimize the estimation difference for the figure of merit based on a plurality of hypothesized user positions and an optimization routine; and
  output a user position based on a hypothesized user position associated with the minimized figure of merit.

* * * * *